US010442356B2

(12) United States Patent
Bobik

(10) Patent No.: US 10,442,356 B2
(45) Date of Patent: Oct. 15, 2019

(54) HMMWV CENTER REAR VIEW MIRROR BRACKET

(71) Applicant: David James Bobik, Kingston, IL (US)

(72) Inventor: David James Bobik, Kingston, IL (US)

( * ) Notice: Subject to any disclaimer, the term of this patent is extended or adjusted under 35 U.S.C. 154(b) by 0 days.

(21) Appl. No.: 15/865,034

(22) Filed: Jan. 8, 2018

(65) Prior Publication Data

US 2019/0210528 A1    Jul. 11, 2019

(51) Int. Cl.
*B60R 1/04* (2006.01)
*F16M 13/02* (2006.01)
*F41H 7/02* (2006.01)

(52) U.S. Cl.
CPC ............ *B60R 1/04* (2013.01); *F16M 13/02* (2013.01); *F41H 7/02* (2013.01)

(58) Field of Classification Search
USPC .......................................... 248/200; 361/871
See application file for complete search history.

(56) References Cited

U.S. PATENT DOCUMENTS

| | | | | |
|---|---|---|---|---|
| 1,651,896 A | * | 12/1927 | La Hodny | A47G 1/24 248/274.1 |
| 3,744,885 A | * | 7/1973 | Hurtado | B60R 1/002 359/863 |
| 4,687,305 A | * | 8/1987 | Harris, Jr. | G02B 7/1824 248/479 |
| 5,100,093 A | * | 3/1992 | Rawlinson | B63B 35/85 248/279.1 |
| D358,795 S | * | 5/1995 | Viola | D12/187 |

FOREIGN PATENT DOCUMENTS

| | | | | |
|---|---|---|---|---|
| CN | 206031023 U | * | 3/2017 | |
| CN | 206336228 U | * | 7/2017 | |
| FR | 2244346 A5 | * | 4/1975 | B60R 1/078 |

* cited by examiner

*Primary Examiner* — Alfred J Wujciak
(74) *Attorney, Agent, or Firm* — Reinhart Boerner Van Deuren P.C.

(57) ABSTRACT

This invention is a center rear view mirror bracket for the HMMWV series vehicles. This bracket allows for the installation of a center rear view mirror on the HMMWV. The bracket is attached to the HMMWV using existing bolt holes on the windshield frame where wiper motor is attached. A center rear view mirror is then attached to the end of the bracket.

4 Claims, 2 Drawing Sheets

HMMWV CENTER REAR VIEW MIRROR BRACKET

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

This invention of a center rear view mirror bracket pertains to the military HMMWV (High Mobility Multipurpose Wheeled Vehicle—Truck, Utility: Cargo/Troop Carrier, 1¼ Ton, 4×4, M998, N.S.N. #23-20-01-107-7155) series vehicles. The military HMMWV series vehicles were not equipped with a center rear view mirror.

BRIEF SUMMARY OF THE INVENTION

This center rear view mirror bracket is designed for the military HMMWV series vehicles. The design uses 2 existing bolt holes on the windshield frame where the wiper motor is installed. This bracket allows for the mounting of a standard rear view mirror using a ball and stud attached to end of the center rear view mirror bracket. This mirror bracket allows the individual to install a center rear view mirror without modification to existing vehicle. The center rear view mirror enhances vision while operating vehicle solving the problem of a missing center rear view mirror. The windshield comprises a middle portion extending from a top of the frame to a bottom of the frame to split the windshield in two pieces.

DETAILED DESCRIPTION OF THE INVENTION

Figure 1C:
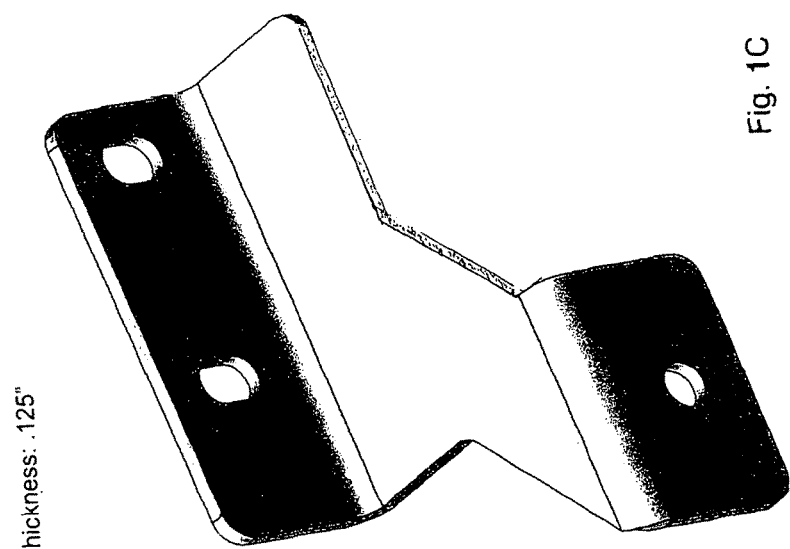
FIG. 1C depicts isometric view of HMMWV Center Rear View Mirror Bracket
Figure 1A:
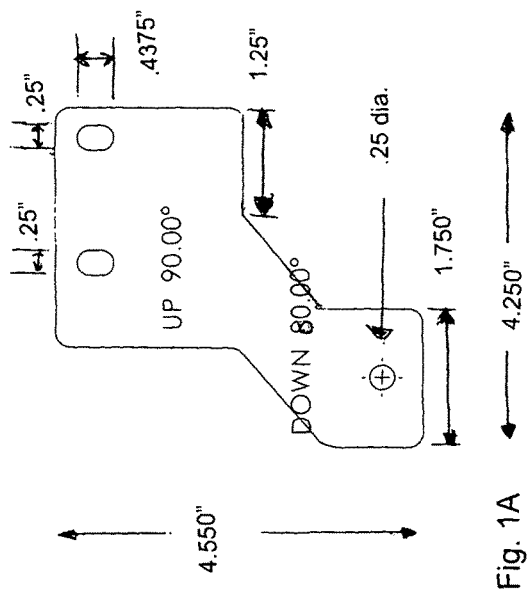
FIG. 1A depicts top view of the HMMWV Center Rear View Mirror Bracket
Figure 1B:
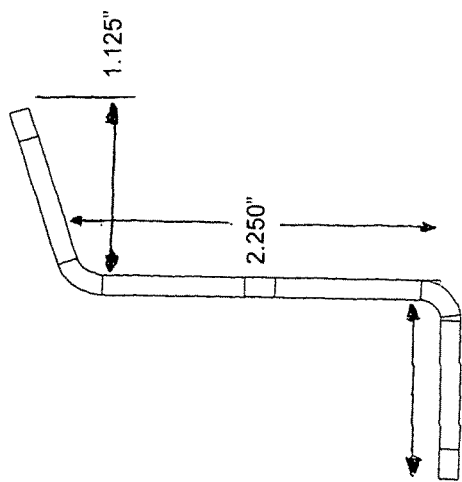
FIG. 1B depicts side view of the HMMWV Center Rear View Mirror Bracket
Figure 2:
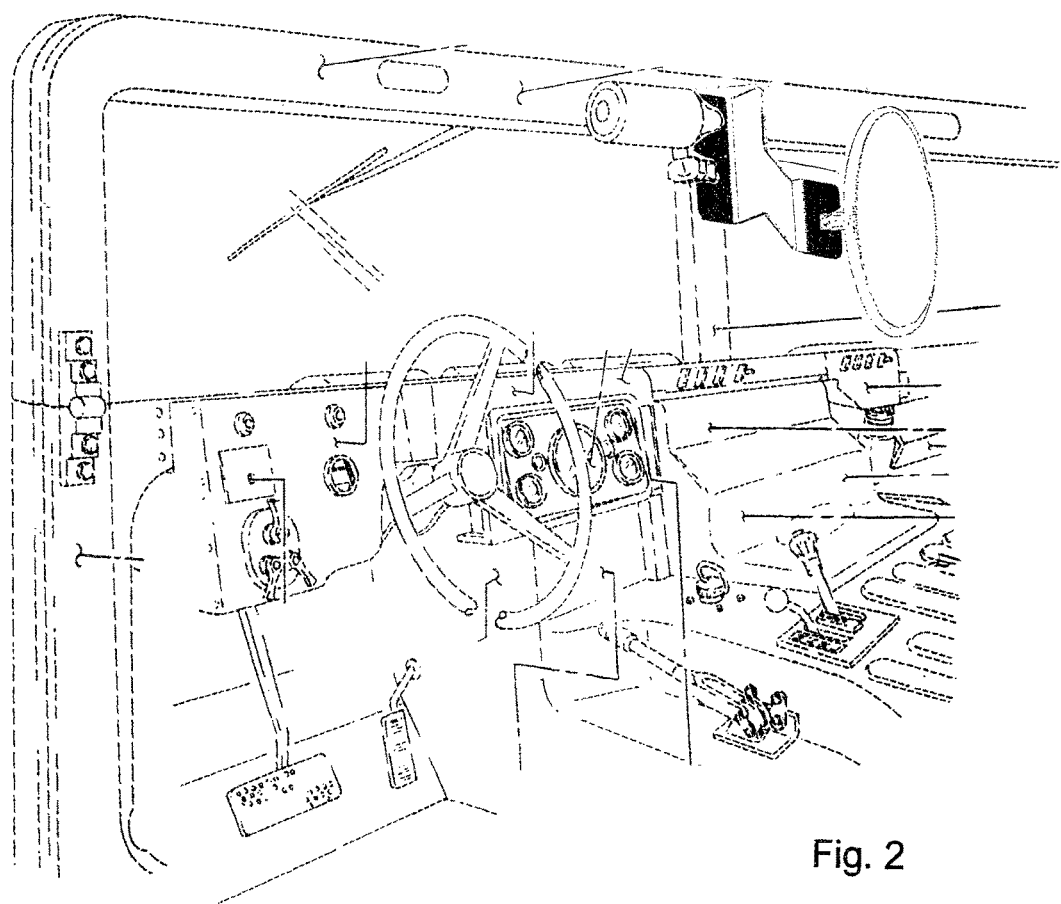
FIG. 2 depicts location of where mounting bracket is to be installed using existing drawing of the HMMWV windshield frame as shown in the US Gov't technical manual TM 9-2320-280-24P-2 FIG. 354

The HMMWV center rear view mirror bracket is made from A36 mild steel or 5052 aluminum, 0.125" thick. It has two bends on each end of the bracket folded opposite each other. The side of the bracket that mounts to the existing holes in the windshield frame where the wiper motor is installed will be bent at a 90 degree angle and have two elongated 0.25" mounting holes, the side of the bracket that the rear view mirror ball stud mounts will be bent at an 80 degree angle and have one ¼" dia. hole. The basic shape of the bracket is cut from steel bar stock to the sizes indicated in FIG. 1A and FIG. 1B. All corners are to have similar 0.125" radius edges. The are no previous designs for mounting a center rear view mirror on the military HMMWV series vehicles.

The invention claimed is:

1. A bracket system for the installation of a center rear view mirror without modification to an HMMWV series vehicle, the bracket system comprising:
   a windshield frame of the HMMWV series vehicle, wherein the windshield frame comprising a middle portion extending from a top of the frame to a bottom of the frame to split a windshield in two pieces;
   a central portion having a first side and a second side opposite the first side;
   a frame attachment portion connected to the central portion on the first side, the frame attachment portion oriented at a 90-degree angle from the central portion and having two openings spaced so as to facilitate attachment of the bracket to an interior portion of the HMMWV series vehicle, wherein the bracket is attached via two existing holes in the middle portion of the windshield frame of the HMMWV series vehicle; and
   a mirror attachment portion connected to the central portion on the second side, the mirror attachment portion oriented at an 80-degree angle from the central portion and having one opening to facilitate attachment of the center rear view mirror to the bracket.

2. The bracket of claim 1, wherein the two openings on the frame attachment portion are spaced to align with the two existing holes in the windshield frame where a wiper motor is installed.

3. The bracket of claim 2, wherein each of the two openings measures 0.25 of an inch by 0.4375 of an inch.

4. The bracket of claim 1, wherein the central portion, the frame attachment portion, and the mirror attachment portion are each constructed from 0.125-of-an-inch-thick metal.

* * * * *